United States Patent
Lee

(10) Patent No.: US 11,193,473 B2
(45) Date of Patent: Dec. 7, 2021

(54) HORIZONTAL AND VERTICAL AXIS WIND GENERATOR

(71) Applicant: Jung Hoon Lee, Wheaton, IL (US)

(72) Inventor: Jung Hoon Lee, Wheaton, IL (US)

( * ) Notice: Subject to any disclaimer, the term of this patent is extended or adjusted under 35 U.S.C. 154(b) by 0 days.

(21) Appl. No.: 15/224,533

(22) Filed: Jul. 30, 2016

(65) Prior Publication Data
US 2018/0030957 A1   Feb. 1, 2018

(51) Int. Cl.
| | |
|---|---|
| *F03D 9/11* | (2016.01) |
| *F03D 3/00* | (2006.01) |
| *F03D 3/04* | (2006.01) |
| *F03D 3/02* | (2006.01) |
| *F03D 15/20* | (2016.01) |

(52) U.S. Cl.
CPC .............. *F03D 9/11* (2016.05); *F03D 3/002* (2013.01); *F03D 3/005* (2013.01); *F03D 3/02* (2013.01); *F03D 3/04* (2013.01); *F03D 3/0463* (2013.01); *F03D 15/20* (2016.05); *Y02B 10/30* (2013.01); *Y02E 10/74* (2013.01)

(58) Field of Classification Search
CPC . F03D 9/002; F03D 9/25; F03D 80/60; F03D 3/02; F03D 3/0463; F03D 3/005; F03D 9/11; F03D 1/04; H02K 7/08; H02K 7/183; H02K 9/02; H02K 1/06; Y02E 10/74; Y02E 10/72
See application file for complete search history.

(56) References Cited

U.S. PATENT DOCUMENTS

| | | | | |
|---|---|---|---|---|
| 4,019,828 A | * | 4/1977 | Bunzer | B60K 16/00 180/2.2 |
| 4,237,384 A | * | 12/1980 | Kennon | F03D 3/0472 290/55 |
| 4,545,729 A | * | 10/1985 | Storm | F03D 7/06 416/119 |
| 6,800,955 B2 | * | 10/2004 | McDavid, Jr. | F03D 1/04 290/43 |
| 7,931,434 B2 | * | 4/2011 | Raynal | F03D 1/04 290/44 |
| 8,128,337 B2 | * | 3/2012 | Pezaris | F03D 3/02 415/191 |
| 8,188,614 B2 | * | 5/2012 | Pagliasotti | E04F 13/007 290/55 |
| 8,210,792 B2 | * | 7/2012 | Suma | F03D 3/0409 415/126 |
| 9,328,717 B1 | * | 5/2016 | Walker | F03D 3/005 |
| 2012/0074706 A1 | * | 3/2012 | Lynn | F03D 3/02 290/55 |
| 2013/0341934 A1 | * | 12/2013 | Kawanishi | B60L 8/00 290/1 A |
| 2016/0108887 A1 | * | 4/2016 | Lee | F03D 3/005 415/208.1 |
| 2017/0175711 A1 | * | 6/2017 | Burkle | F03D 9/25 |

* cited by examiner

Primary Examiner — Michael C Zarroli
(74) Attorney, Agent, or Firm — Sang Ki Lee; Law Offices of Sang Lee

(57) ABSTRACT

An embodiment of Horizontal and Vertical Axis Wind Generator (HVAWG) concept with rotating big and small wings, magnetic coils, and magnetic field magnets attached to the wings. The generator motors use the generator motor coils, the generator motor magnets, magnetic field coils and magnetic field magnets to help produce the power using the repulsive characters of the same magnetic poles. Also, both the outside and the inside parts of the generator motors rotate while the inside parts of the generator motors rotate in the traditional wind generators.

1 Claim, 8 Drawing Sheets

HORIZONTAL AND VERTICAL AXIS WIND GENERATOR

STATEMENT REGARDING FEDERALLY SPONSORED RESEARCH OR DEVELOPMENT

Not Applicable

FIELD

The present invention relates to a wind generator, more specifically, a wind generator with the horizontal axis and the vertical axis that include big and small wings, magnetic field magnets, magnetic field cons, generator motor, generator motor cons, generator motor magnets, bearings, air cooled coolant system, airflow controllers and front air intake opening.

BACKGROUND

Wind energy does not pollute the air like power plants that rely on combustion of fossil fuels, such as coal or natural gas. Also, wind turbines do not produce atmospheric emissions that cause acid rain or greenhouse gasses. Finally, mobile cars or mobile homes which use wind energy do not need charging stations for recharging the energy. Wind generator is environment friendly and provides the most popular way of harvesting wind energy.

Wind turbines or generators are categorized as Horizontal-axis Wind Turbine (HAWT) and Vertical-axis Wind Turbines (VAWT). Researchers Erikson, Bernhoff and Leijon compared VAWT and HAWT designs in their article titled "Evaluation of different turbine concepts for wind power" which was published in 2008 in Renewable & Sustainable Energy Review issue 12. According to this article, HAWT design which most commercial wind farms utilize are considered complicated due to yaw mechanism which orients the turbine toward the wind and pitch mechanism that regulates the speed of the propeller. The article also mentions that HAWT designs are hard to maintain due to the fact that generator assembly is placed high above the ground. These mechanisms complicate the HAWT design and makes maintenance difficult due to the fact that all these mechanisms are placed high above the ground. The article also mentions that HAWT designs have almost reached their maximum possible size for electric energy applications due to cyclically reversing gravitational loads on their blades.

Vertical-axis Wind Turbines (VAWT) may seem simpler in terms of structure due to the fact that they do not require to be oriented toward the wind. According to Erikson et al., this omni-directional nature of the turbine makes it very attractive for locations where wind frequently changes its direction. However, VAWT design has also has its own complications. Theoretically the efficiency of VAWT design is less than the efficiency of HAWT design due to the active area of the turbine which faces the wind. The theoretical maximum power coefficient of wind turbines is called Betz limit and found to be Cp=0.59. For HAWT designs this factor of performance is between 0.40 and 0.50. In case of VAWT designs this factor is found to be no more than 0.40 [Erikson et al.] Another factor of VAWT design that negatively affects the efficiency is the fact that while one of the vanes of VAWT is exposed to wind and converting the wind energy, another vane is being moved against the wind to continue the rotation of the turbine.

Despite all these negative points, mechanical simplicity of VAWT makes it very attractive for commercial wind farm applications. According to the literature, VAWT turbines can be packed denser than HAWT turbines since that cause less turbulence. However, there are still some difficulties that hinder the application of VAWT designs in wind farm applications. Currently VAWT has three major obstacles which impede its commercial applicability. These are;

1. Storm protection. When wind speed reaches gale force level, there should be a mechanism to shut down the turbine and mechanically protect the structure and the vanes of the turbine from damage. This is not available with traditional VAWT designs like Savonius, Darrius and H-rotor design.
2. Speed regulation. There is a need for a speed control mechanism to regulate the rotational speed of the turbine so that power generated is less dependent on the wind speed.
3. Portable Size. There is a need for a smaller wind generator with enough capability for cars, boats, motor cycles, camping cars, drones, homes, offices, and power plants.

These three problems are the main obstacles toward the commercialization of VAWT design. Recently there are attempts to solve these three problems. One of the most notable attempts is a patent filed by Sullivan with publication number US 2010/0172759 which uses airfoil shaped vanes and a mechanism for retracting vanes toward the rotational shaft on demand. The mentioned design is very similar to H-rotor design with retraction and storm protection capability added. Also, a patent filed by Ozkul with publication number WO 2011/141777 uses articulated vanes for VAWT design which can be raised or lowered automatically to regulate the angular speed of rotation of the turbine. Erikson et al. states in their mentioned research that VAWT design essentially operate in drag mode, which limits the speed of rotation and requires larger blade area than the HAWT designs. These trade-offs are acceptable as long as the cost of manufacture of blades are reduced. In addition, the traditional VAWT designs which require larger blades and big space can not be installed easily for cars, boats, motor cycles, camping cars, drones, homes, and offices.

SUMMARY

The purpose of the present invention is a modification of VAWT design which has storm protection capability as well as speed regulation capability of HAWT design. The invention uses the horizontal axis for VAWT design which can be rotated automatically to regulate the angular speed of rotation of the turbine. Even though the efficiency of VAWT design is theoretically lower than commercial HAWT's, the main features of the present invention enable us to scale up the VAWT design which may make up for the lower efficiency. The present design differs from US 2010/0172759 application by the use of flexible generator motors, generator motor coils, generator motor magnets, bearings, magnetic field coils magnetic field magnets, air cooled coolant system, airflow controllers and front air intake opening without using the vanes. Also, the present design differs from WO 2011/141777 by the use of flexible generator motors, generator motor coils, generator motor magnets, bearings, magnetic field coils, magnetic field magnets, air cooled coolant system, airflow controllers and front air intake opening without using the vanes.

The main feature of the design is its scalability for electric energy applications for cars, boats, motor cycles, camping cars, drones, homes, and offices. To achieve the above object, according to the present invention, the first and big wings are connected to the generator motors and the small wings are connected to the generator motors. The small wings are rotated by the primary and uncontrolled wind to generate the secondary wind (after passing the small wings) for the big wings. The big wings are rotated by the secondary and controlled wind in addition to the primary wind to generate the electric energy. There are generator motor magnets and the generator motor coils in the generator motors which can be added to the wind energy using the magnetic energy of the same and repulsive magnetic poles. When you place the North pole of one magnet near the South pole of another magnet, they are attracted to one another. When you place like poles of two magnets near each other (North to North or South to South), they will repel each other. The magnetic field coil and magnetic field magnet are mounted on the first and big wings. The repulsive force from the magnetic field coils and magnetic field magnets in the big wings can be added to the wind energy using the magnetic energy of the same magnetic poles. The present invention differs from the traditional inventions in that both the outside and the inside parts of the generator motors rotate in the current design while the inside parts of generator motors rotate in the traditional designs. The number and the size of big wings and small wings can be adjusted depends on the particular application. These features allows for a number of improvements over the current state of the art including damage protection, scalability depending the application and the speed regulation ability to remain operational during high wind and low wind conditions. The wind energy is efficiently passed to the generator motor in both high wind and low wind conditions.

Finally, the material of the horizontal and vertical axis wind generator is aluminum which is lighter, is easier to be installed, is durable and is corrosion resistant.

BRIEF DESCRIPTION OF THE DRAWINGS

Various embodiments of the invention are disclosed in the following detailed description and accompanying drawings.

The following numbers represent the various parts of The Horizontal and Vertical Axis Wind Generator:
1. The Horizontal and Vertical Axis Generator
2. The First and Big Wings
3. The Second and Small Wings
4. The Magnetic field Magnets
5. The Generator Motor
6. The Magnetic Field Coils
7. The Generator Motor Magnets
8. The Generator Motor Coils
9. The Bearings
10. The Air Cooled Coolant System
11. The Airflow Controller
12. The Front Air Intake Openings

DETAILED DESCRIPTION OF THE INVENTION

The detailed description of the operation of the horizontal and vertical axis wind generator and magnets is explained in this section with reference to the accompanying drawings.

Figure 1:
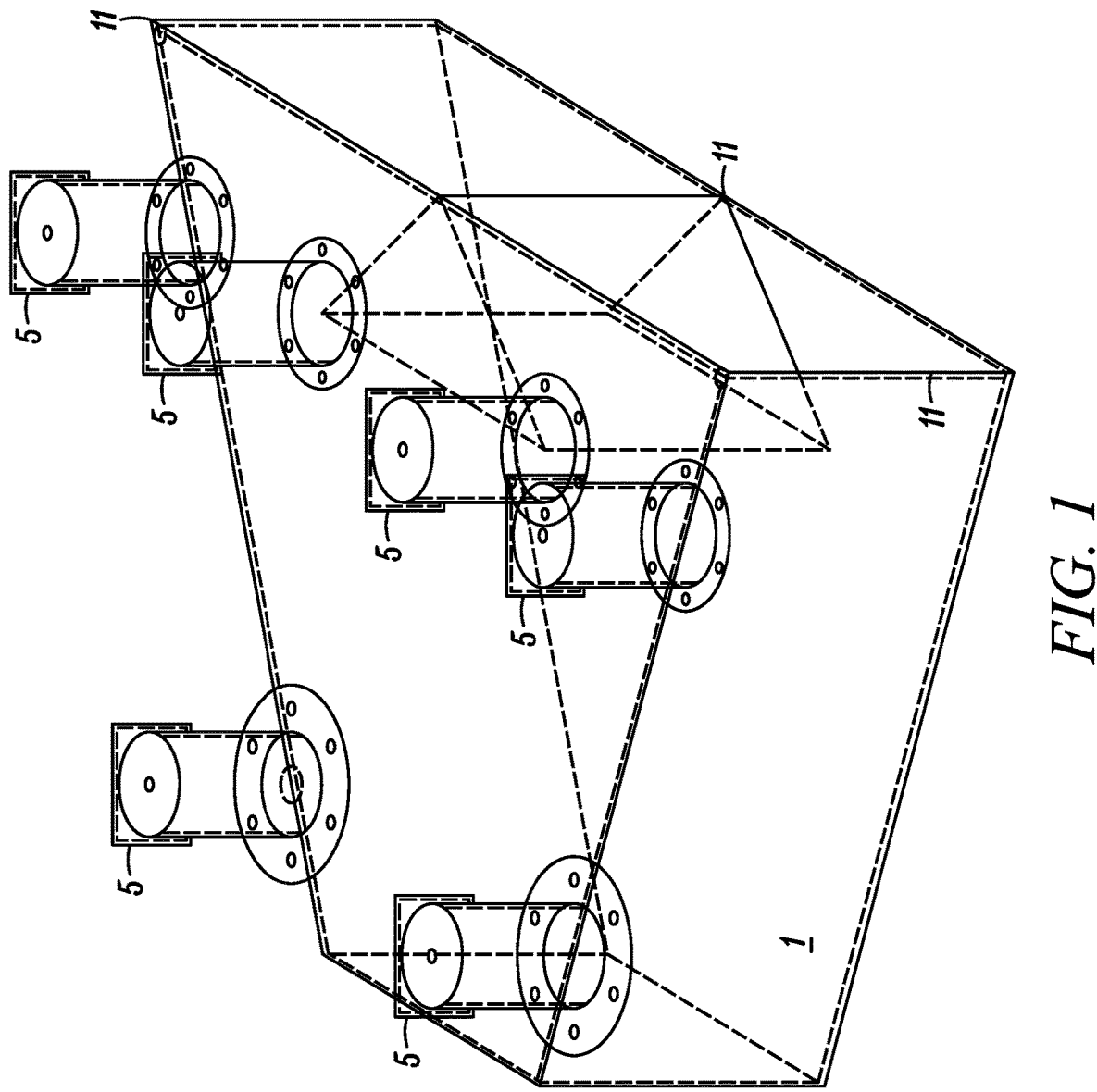
FIG. 1 is a perspective view of a horizontal and vertical axis wind generator according to the present invention to show generator motors.

According to FIG. 1, the perspective view of the generator motors (5) and the airflow controllers (11) of the horizontal and vertical axis wind generator (1) is shown. The generator motors (5) are mounted on the top of the horizontal and vertical axis wind generator (1).

Figure 2:
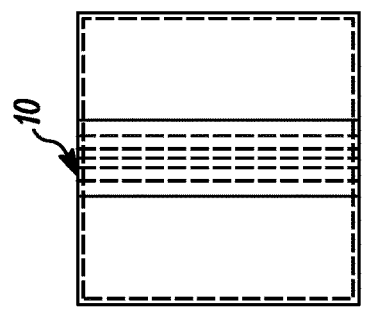
FIG. 2 is a side view of the air coolant in the horizontal and vertical axis wind generator.

Referring to FIG. 2, the side view of the air cooled cooling system (10) of the horizontal and vertical axis wind generator is shown.

Figure 3:
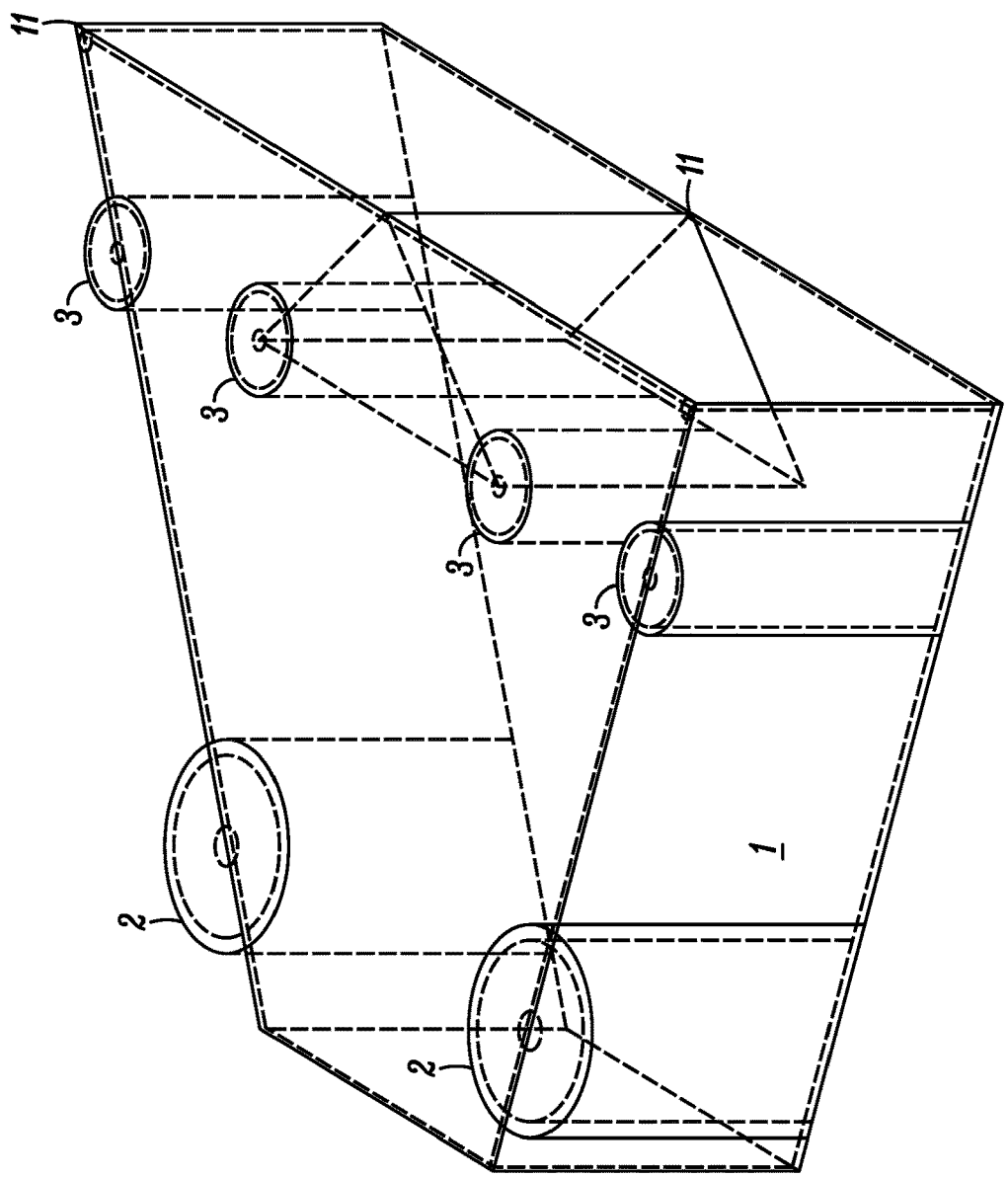
FIG. 3 is a perspective view of the horizontal and vertical axis wind generator to show big wings and small wings.

Referring to FIG. 3, the first and big wings (2), the second and small wings (3) and the airflow controllers (11) are mounted inside of the horizontal and vertical axis wind generator (1). The airflow turn the small wings (3) first and the big wings (2) second.

Figure 4:
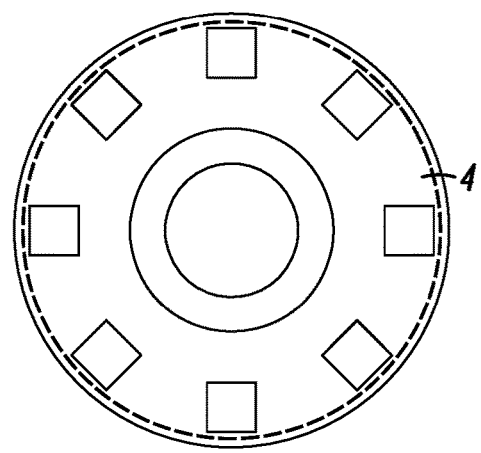
FIG. 4 is a top view of the generator motor in the horizontal and vertical axis wind generator.

According to FIG. 4, the top view of the generator motor (5) with the magnetic field magnets (4) of the horizontal and vertical axis wind generator is shown.

Figure 5:
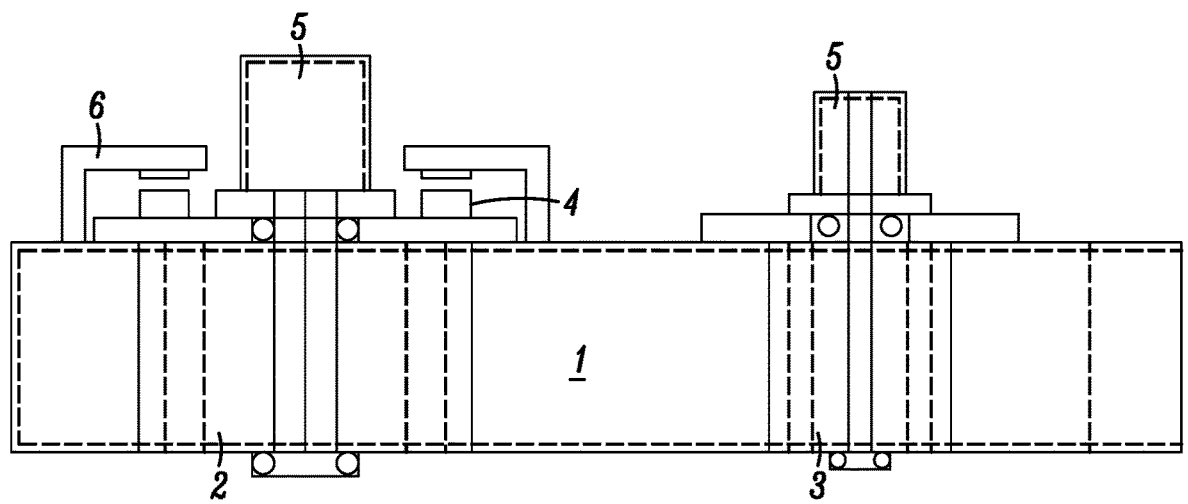
FIG. 5 is a side view of the horizontal and vertical axis wind generator.

According to FIG. 5, the side view of the generator motor (5) with the magnetic field magnets (4), magnetic field coils (6), the first and big wings (2) and the second and small wings (3) of the horizontal and vertical axis wind generator (1) is shown.

Figure 6:
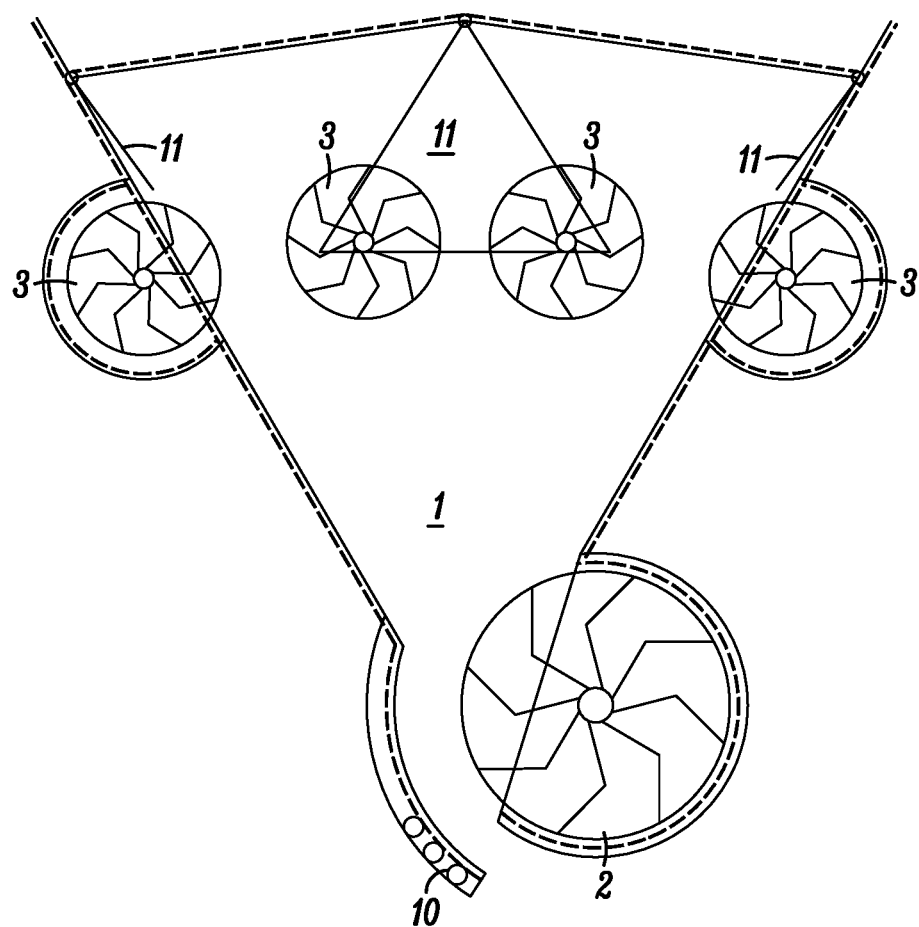
FIG. 6 is a top view of the horizontal and vertical axis wind generator to show the first and big wings and the second and small wings.

According to FIG. 6, the top view of big wings (23), the second and small wings (32), the air cooled coolant system (10) and airflow controllers (11) of the horizontal and vertical axis wind generator (1) is shown. The air cooled coolant system (10) cools down the generator motors (5) with attached batteries.

Figure 7:
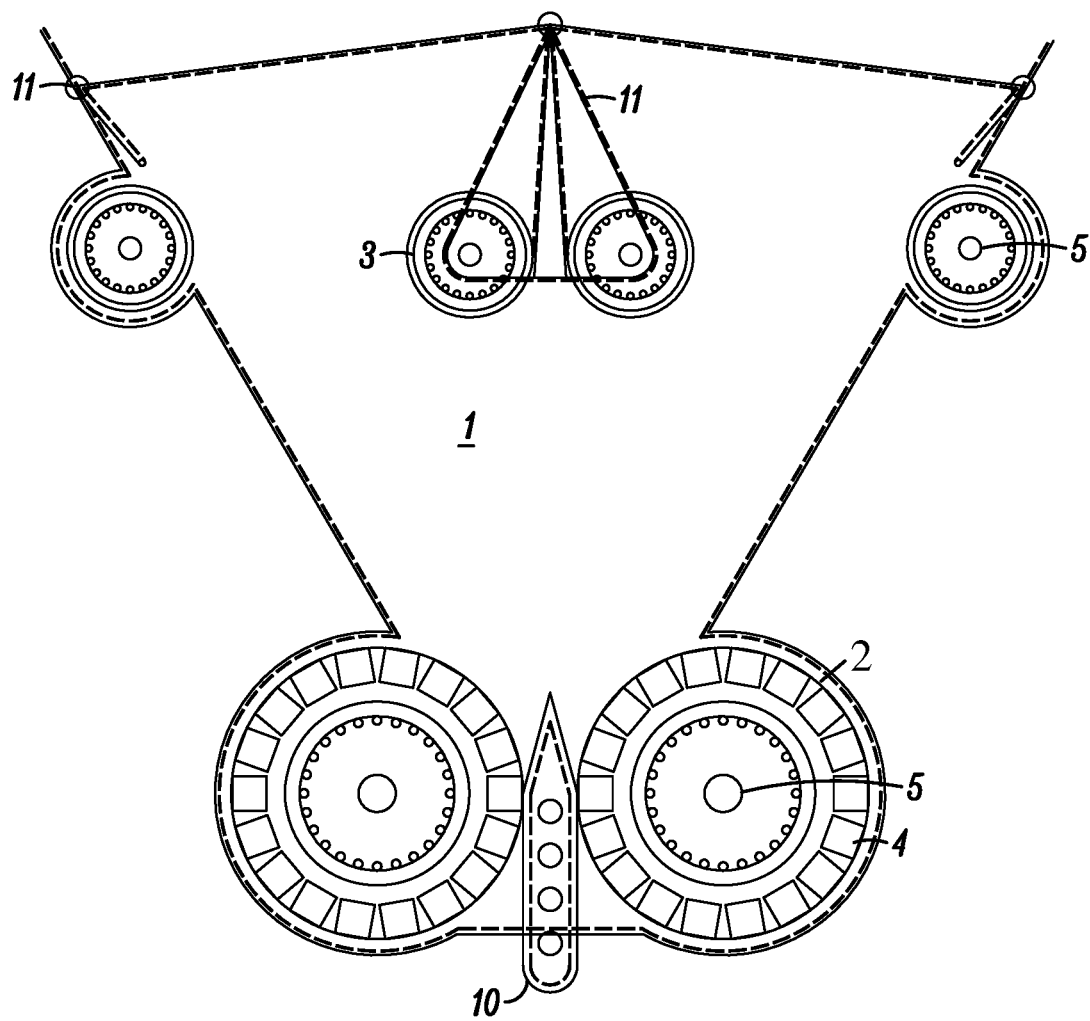
FIG. 7 is a top view of the horizontal and vertical axis wind generator to show magnet field coils and magnetic field magnets.

According to FIG. 7, the top view of the generator motor (5) with the magnetic field magnets (4), the first and big wings (2), the second and small wings (3), the air cooled coolant system (10) and airflow controller (11) of the horizontal and vertical axis wind generator (1) is shown.

Figure 8:
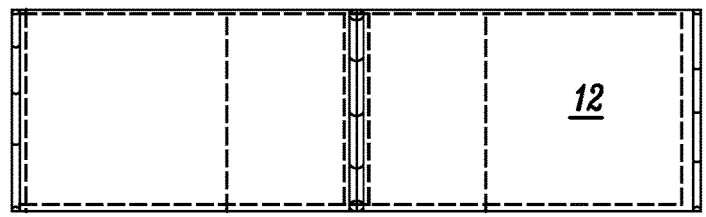
FIG. 8 is a side view of the front air intake in the horizontal and vertical axis wind generator.

According to FIG. 8, the side view of the front air intake opening (12) of the horizontal and vertical axis wind generator (1) is shown.

Figure 9:
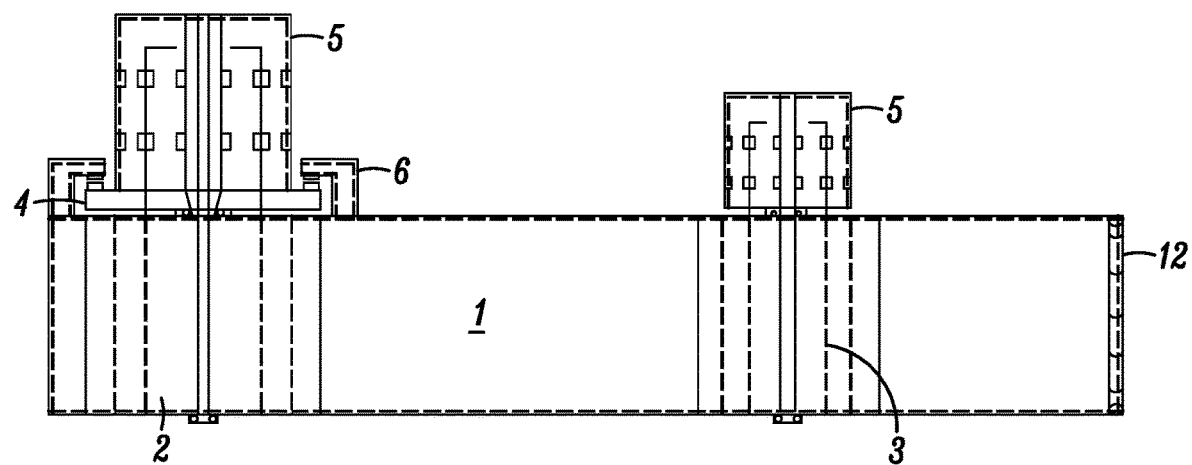
FIG. 9 is a side view of the horizontal and vertical axis wind generator to show generator motors, generator magnets and generator coils.

According to FIG. 9, the side view of the generator motors (5), magnetic field coils (6), magnetic field magnets (4), front air intake opening (12), the first and big wings (2) and the second and small wings (3) of the horizontal and vertical axis wind generator (1) is shown. The repulsive force between the magnetic field coils (6) and magnetic field magnets (4) in the first and big wings (2) can be added to the wind energy using the magnetic energy of the same magnetic poles.

Figure 10:
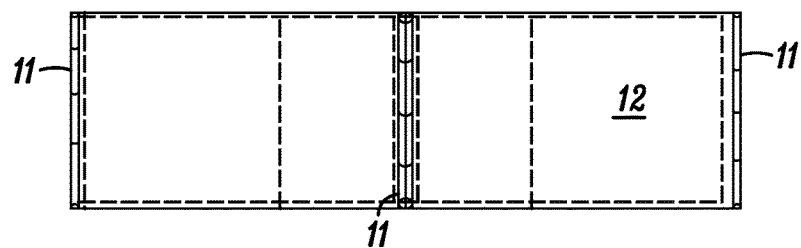
FIG. 10 is a side view of the front air intake and the airflow controllers in the horizontal and vertical axis wind generator.

According to FIG. 10, the side view of the airflow controller (11) and front air intake opening (12) of the horizontal and vertical axis wind generator is shown.

Figure 11:
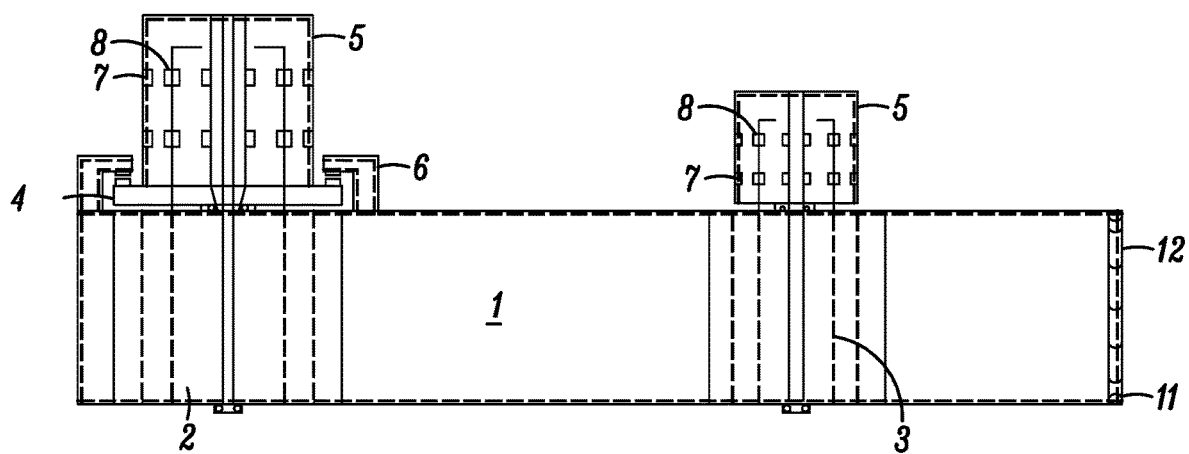
FIG. 11 is a side view of the horizontal and vertical axis wind generator to show generator motor coils, generator motor magnets, magnetic field coils, magnetic field magnets, the airflow controllers and the front air intake.

According to FIG. 11, the side view of the generator motor (5), generator motor coil (8), generator motor magnets (7), magnetic field coil (6), magnetic field magnets (4), the first and big wings (2), the second and small wings (3), the airflow controller (11) and the front air intake opening (12) of the horizontal and vertical axis wind generator (1) is shown. The generator motors (5) are mounted above the first and big wings (2) and the second and small wings (3) There are the repulsive force from the generator motor magnets (7) and the generator motor coils (8) in the generator motors (5) which can be added to the wind energy using the magnetic energy of the same magnetic poles. The magnetic field coil (6) and magnetic field magnet (4) are mounted on the first and big wings (2). The repulsive force between magnetic field coils (6) and magnetic field magnets (4) in the first and big wings can be added to the wind energy using the magnetic energy of the same magnetic poles. Traditionally, the inside of generator motors turn while the outside of generator motors (5) turn in the present invention.

Figure 12:
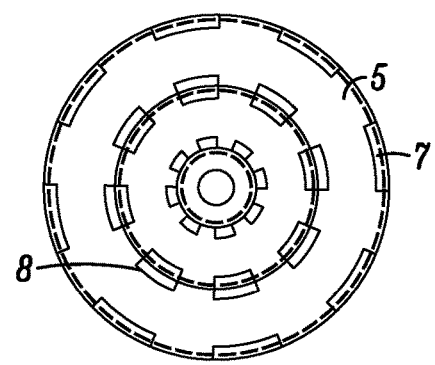
FIG. 12 is a top view of the generator motor coils and generator motor magnets in the horizontal and vertical axis wind generator.

According to FIG. 12, the top view of the generator motor (5), the generator motor magnets (7) and generator motor coils (8) of the horizontal and vertical axis wind generator (1) is shown.

Figure 13:
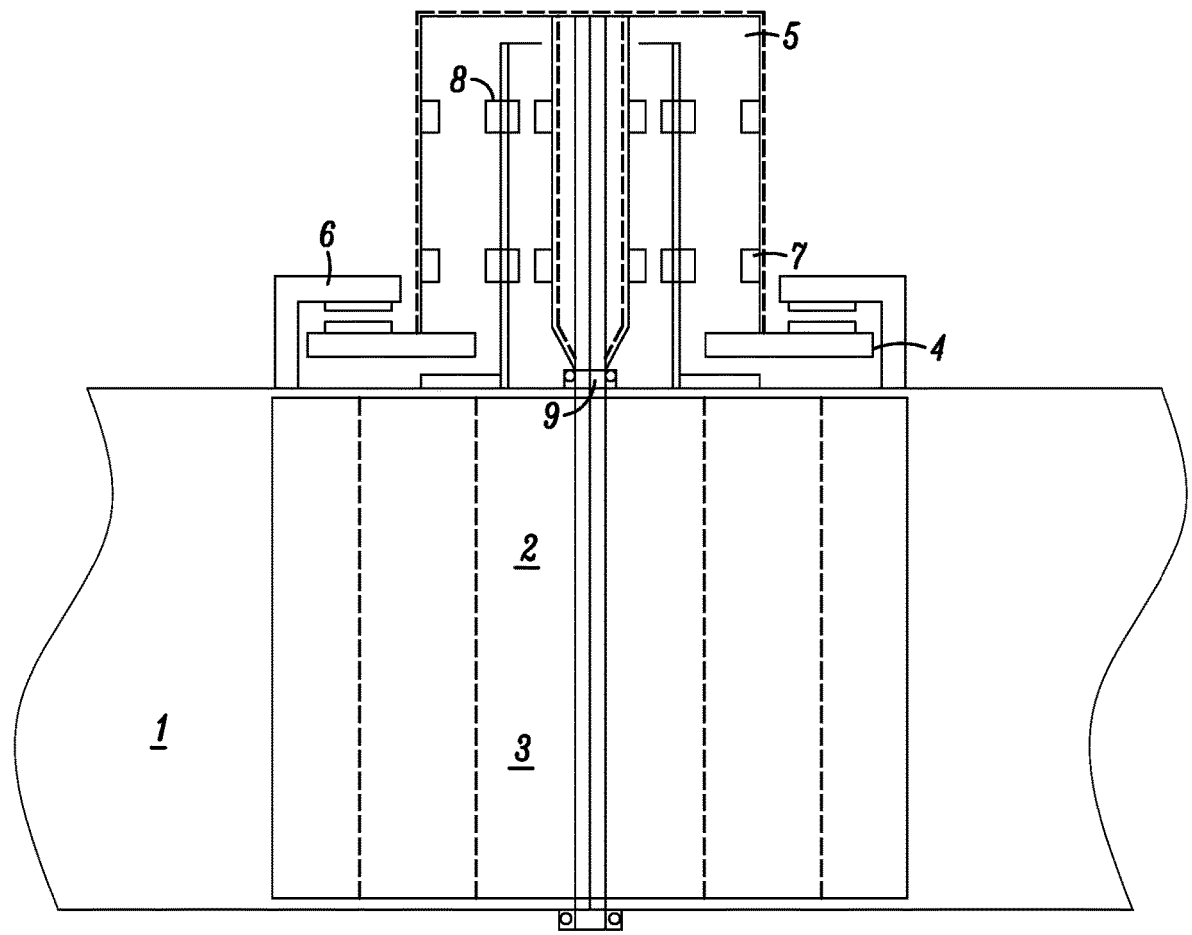
FIG. 13 is a side view of the horizontal and vertical axis wind generator to show generator motor coils, generator motor magnets, bearings, magnet field coils, magnetic field magnets and the main body.

According to FIG. 13, the side view of the generator motor (5), the generator motor magnets (7), generator motor coils (8), magnetic field coil (6), magnetic field magnets (4), the first and big wings (2), the second and small wings (3) and bearings (9) of the horizontal and vertical axis wind generator (1) is shown.

The invention claimed is:

1. A wind-powered device with an energy-generating device comprised of both horizontal and vertical axis wind generators and further comprising;
    big wings and small wings, magnetic coils, magnetic field magnets, a generator motor, generator motor coils, generator motor magnets and bearings;
    the wind generators are primarily made from aluminum and;
    airflow controllers control airflow into and out of the wind generators;
    the big wings and small wings are attached to both the horizontal and vertical axis wind generators;
    wherein said magnetic field magnets and magnetic field coils are functionally attached to the big wings and said magnetic field magnets and magnetic field coils amplify the produced power from the big wings by using the magnetic energy of the magnetic poles and;
    said generator motor operates from the horizontal and vertical axis wind generators with both outside and inside parts of the generator motors rotate;
    said generator magnets and generator coils are attached to the generator motor;
    a shutdown mechanism protects the structure;
    wherein the repulsive force between the generator magnets and generator coils can be added to the power using the magnetic energy of the same magnetic poles.

* * * * *